United States Patent
Svendsen et al.

(10) Patent No.: US 12,160,292 B2
(45) Date of Patent: Dec. 3, 2024

(54) POLARIZATION SPLIT FOR ENHANCED MIMO THROUGHPUT

(71) Applicant: NOKIA TECHNOLOGIES OY, Espoo (FI)

(72) Inventors: Simon Svendsen, Aalborg (DK); Samantha Caporal Del Barrio, Aalborg (DK); Benny Vejlgaard, Gistrup (DK); Christian Rom, Aalborg (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 434 days.

(21) Appl. No.: 17/525,529

(22) Filed: Nov. 12, 2021

(65) Prior Publication Data

US 2022/0159491 A1     May 19, 2022

(30) Foreign Application Priority Data

Nov. 16, 2020  (FI) ..................................... 20206157
Jan. 15, 2021  (FI) ..................................... 20215055

(51) Int. Cl.
*H04W 24/08*     (2009.01)
*H04B 7/0426*    (2017.01)
(Continued)

(52) U.S. Cl.
CPC ......... *H04B 7/0456* (2013.01); *H04B 7/0426* (2013.01); *H04B 17/318* (2015.01); *H04B 17/336* (2015.01); *H04W 24/08* (2013.01)

(58) Field of Classification Search
CPC .. H04B 7/0456; H04B 7/0426; H04B 7/0802; H04B 7/0874; H04B 7/0486;
(Continued)

(56) References Cited

U.S. PATENT DOCUMENTS 7,515,916 B1 *  4/2009  Alexander ............ H04W 24/08
                                                      345/582
10,790,885 B1    9/2020  Raghunathan et al.
(Continued)

FOREIGN PATENT DOCUMENTS

CN    109792316 A    5/2019
EP    1 596 506 A1   11/2005
(Continued)

OTHER PUBLICATIONS

First Office Action dated Jan. 4, 2024 corresponding to Chinese Patent Application No. 202111350125.3, with English translation thereof.
(Continued)

*Primary Examiner* — Khaled M Kassim
*Assistant Examiner* — Hector Reyes
(74) *Attorney, Agent, or Firm* — SQUIRE PATTON BOGGS (US) LLP (57) ABSTRACT

According to an example aspect of the present invention, there is provided a method, comprising: determining a quality metric for multiple input multiple output (MIMO) signal; comparing the determined quality metric to a threshold; and evaluating a power delay profile (PDP) of a radio channel based on the result of the comparison.

19 Claims, 8 Drawing Sheets

(51) Int. Cl.
*H04B 7/0456* (2017.01)
*H04B 17/318* (2015.01)
*H04B 17/336* (2015.01)

(58) Field of Classification Search
CPC .......... H04B 7/0413; H04B 7/10; H04B 7/08;
H04B 17/318; H04B 17/336; H04L
5/0048; H04W 24/08
See application file for complete search history.

(56) References Cited

U.S. PATENT DOCUMENTS

| | | | |
|---|---|---|---|
| 2005/0255819 | A1 | 11/2005 | Kawamoto et al. |
| 2009/0074099 | A1 | 3/2009 | Zheng et al. |
| 2015/0229493 | A1 | 8/2015 | Lee et al. |
| 2016/0036508 | A1 | 2/2016 | Szini et al. |
| 2017/0093474 | A1* | 3/2017 | Lee .......... H04B 7/04 |
| 2018/0062811 | A1 | 3/2018 | Akkarakaran et al. |
| 2018/0063693 | A1* | 3/2018 | Chakraborty ......... H04W 8/005 |
| 2019/0014003 | A1 | 1/2019 | Homchaudhuri et al. |
| 2021/0281311 | A1* | 9/2021 | Zhang .................. H04B 17/318 |
| 2021/0385040 | A1* | 12/2021 | Pezeshki ............. H04L 25/0254 |
| 2023/0262643 | A1* | 8/2023 | Zach ..................... H04W 24/10 455/456.1 |
| 2024/0069183 | A1* | 2/2024 | Tadayon ............... G01S 5/0263 |

FOREIGN PATENT DOCUMENTS

| | | |
|---|---|---|
| EP | 3 151 448 A1 | 4/2017 |
| GB | 2411328 A | 8/2005 |

OTHER PUBLICATIONS

Extended European Search Report dated Apr. 28, 2022 corresponding to European Patent Application No. 21207336.5.

Zte et al., "QCL design for UL and DL MIMO," 3GPP Draft; R1-1717437, 3GPP TSG RAN WG1 Meeting #90bis, Prague, CZ, Oct. 9-13, 2017, Oct. 8, 2017, XP051340626.

Le Hao et al., "Measurement-Based Massive MIMO Polarimetric Channel Characterization in Outdoor Environment," EEE Access, vol. 7, Dec. 11, 2019, pp. 171285-171296, XP011759026.

Finnish Office Action and Search Report dated May 31, 2021 corresponding to Finnish Patent Application No. 20206157.

3GPP TS 38.211 V16.3.0 (Sep. 2020), Technical Specification, 3rd Generation Partnership Project; Technical Specification Group Radio Access Network; NR; Physical channels and modulation (Release 16), Sep. 2020.

3GPP TS 38.331 V16.2.0 (Sep. 2020), Technical Specification, 3rd Generation Partnership Project; Technical Specification Group Radio Access Network; NR; Radio Resource Control (RRC) protocol specification (Release 16), Sep. 2020.

* cited by examiner

POLARIZATION SPLIT FOR ENHANCED MIMO THROUGHPUT

FIELD

Various embodiments described herein relate to the field of wireless communications and, particularly, to Multiple Input, Multiple Output (MIMO) technology.

BACKGROUND

Today's and future wireless communication systems, such as Long Term Evolution (LTE) or $5^{th}$ Generation (5G), also referred to as New Radio (NR), have been envisaged to use MIMO multi-antenna transmission techniques. Constantly increasing requirements for high throughput motivates the wireless communication systems such as 5G to use the mmWave (millimeter wave) frequencies due to available high bandwidth. Usage of mmWave frequencies however poses new challenges on MIMO performance. Thus, factors such as environment changes or physical orientation of antennas will have an increased performance impact which needs to be taken into account for achieving desired performance.

BRIEF DESCRIPTION

According to some aspects, there is provided the subject-matter of the independent claims. Some embodiments are defined in the dependent claims.

The scope of protection sought for various embodiments of the invention is set out by the independent claims. The embodiments and features, if any, described in this specification that do not fall under the scope of the independent claims are to be interpreted as examples useful for understanding various embodiments of the invention.

According to a first aspect of the present invention, there is provided an apparatus comprising means for determining a quality metric for multiple input multiple output (MIMO) signal; means for comparing the determined quality metric to a threshold; and means for evaluating a Power Delay Profile (PDP) of a radio channel based on the result of the comparison. The apparatus may be a user equipment or a network infrastructure node, such as a base station.

In an embodiment of the first aspect, the signal may be a received signal.

In an embodiment, the quality metric may indicate MIMO rank.

In an embodiment of the first aspect, the apparatus may further comprise means for evaluating the PDP of the radio channel if the determined quality metric is below the threshold.

In an embodiment of the first aspect, the determination of the quality metric may comprise performing at least one measurement on at least one reference signal.

In an embodiment of the first aspect, the evaluating the PDP of the radio channel may comprise PDP measurement for one or more antenna array on at least one further reference signal.

In an embodiment of the first aspect, the PDP measurement may comprise measuring PDP on wide beams for multiple antenna arrays to obtain an information about multiple Angular Power Groups (APGs).

In an embodiment of the first aspect, the apparatus may comprise means for determining an antenna configuration based on result of the evaluation.

In an embodiment of the first aspect, the apparatus may further comprise means for identifying an APG based on result of the evaluation. In an embodiment of the first aspect, the identified APG may be a second APG different from first, currently used APG.

In an embodiment of the first aspect, the apparatus may comprise means for selecting an antenna array among a plurality of antenna arrays for which the identified APG is the strongest among APGs that are currently not in use.

In an embodiment of the first aspect, the apparatus may further comprise means for identifying a reflection with a narrow beam corresponding to the identified APG.

In an embodiment of the first aspect, the apparatus may further comprise means for configuring a transmit and/or receive chain of the apparatus for the identified APG.

In an embodiment of the first aspect, the apparatus may comprise means for configuring the transmit and/or receive chain of the apparatus for the identified APG using different radiation pattern than radiation pattern of a first, currently configured APG, if the identified APG corresponds to an antenna array of the first APG.

In an embodiment of the first aspect, the apparatus may comprise means for configuring the transmit and/or receive chain of the apparatus for the identified APG using optimized polarization, if the identified APG does not correspond to an antenna array of a first, currently configured, APG.

In an embodiment of the first aspect, the apparatus may comprise means for selecting antenna polarization configuration corresponding to at least one of an optimized signal power level or an optimized MIMO rank.

According to a second aspect, there is provided a first method comprising determining a quality metric for multiple input multiple output (MIMO) signal; comparing the determined quality metric to a threshold; and evaluating a power delay profile (PDP) of a radio channel based on the result of the comparison. The method may be performed by a user equipment or by a network infrastructure node, such as a base station.

In an embodiment of the second aspect, the signal may be a received signal.

In an embodiment, the quality metric may indicate MIMO rank.

In an embodiment of the second aspect, the method may further comprise evaluating the PDP of the radio channel if the determined quality metric is below the threshold.

In an embodiment of the second aspect, the determination of the quality metric may comprise performing at least one measurement on at least one reference signal.

In an embodiment of the second aspect, the evaluating the PDP of the radio channel may comprise PDP measurement for one or more antenna array on at least one further reference signal.

In an embodiment of the second aspect, the PDP measurement may comprise measuring PDP on wide beams for multiple antenna arrays to obtain an information about multiple Angular Power Groups (APGs).

In an embodiment of the second aspect, the method may comprise determining an antenna configuration based on result of the evaluation.

In an embodiment of the second aspect, the method may further comprise identifying an APG based on result of the evaluation. In an embodiment of the second aspect, the identified APG may be a second APG different from first, currently used APG.

In an embodiment of the second aspect, the method may comprise selecting an antenna array among a plurality of antenna arrays for which the identified APG is the strongest among APGs that are currently not in use.

In an embodiment of the second aspect, the method may further comprise identifying a reflection with a narrow beam corresponding to the identified APG.

In an embodiment of the second aspect, the method may further comprise configuring a transmit and/or receive chain of a user equipment (UE) for the identified APG.

In an embodiment of the second aspect, the method may comprise configuring the transmit and/or receive chain of a UE for the identified APG using different radiation pattern than radiation pattern of a first, currently configured APG, if the identified APG corresponds to an antenna array of the first APG.

In an embodiment of the second aspect, the method may comprise means for configuring the transmit and/or receive chain of a UE for the identified APG using optimized polarization, if the identified APG does not correspond to an antenna array of a first, currently configured, APG.

In an embodiment of the second aspect, the method may comprise selecting antenna polarization configuration corresponding to at least one of an optimized signal power level or an optimized MIMO rank.

According to a fourth aspect, there is provided an apparatus, comprising at least one processor, at least one memory including computer program code, the at least one memory and the computer program code being configured to, with the at least one processor, cause the apparatus at least to perform the method of the second aspect, or an embodiment thereof.

According to a third aspect of the present invention, there is provided an apparatus comprising at least one processing core, at least one memory including computer program code, the at least one memory and the computer program code being configured to, with the at least one processing core, cause the apparatus at least to determine a quality metric for multiple input multiple output (MIMO) signal; to compare the determined quality metric to a threshold; and to evaluate a power delay profile (PDP) of a radio channel based on the result of the comparison. The apparatus may be a user equipment or a network infrastructure node, such as a base station.

According to a fifth aspect, there is provided a computer program product, comprising program instructions which, when loaded into an apparatus, cause the apparatus at least to determine a quality metric for multiple input multiple output (MIMO) signal; compare the determined quality metric to a threshold; and evaluate a power delay profile (PDP) of a radio channel based on the result of the comparison. The apparatus may be a user equipment or a network infrastructure node, such as a base station.

According to some further aspects, there is provided a computer program, a computer program product, a computer readable medium, or a non-transitory computer readable medium comprising program instructions for causing an apparatus to perform the method according to any one of the above aspects or an embodiment thereof.

LIST OF DRAWINGS

Embodiments are described below, by way of example only, with reference to the accompanying drawings.

DESCRIPTION OF EMBODIMENTS

The embodiments described herein are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
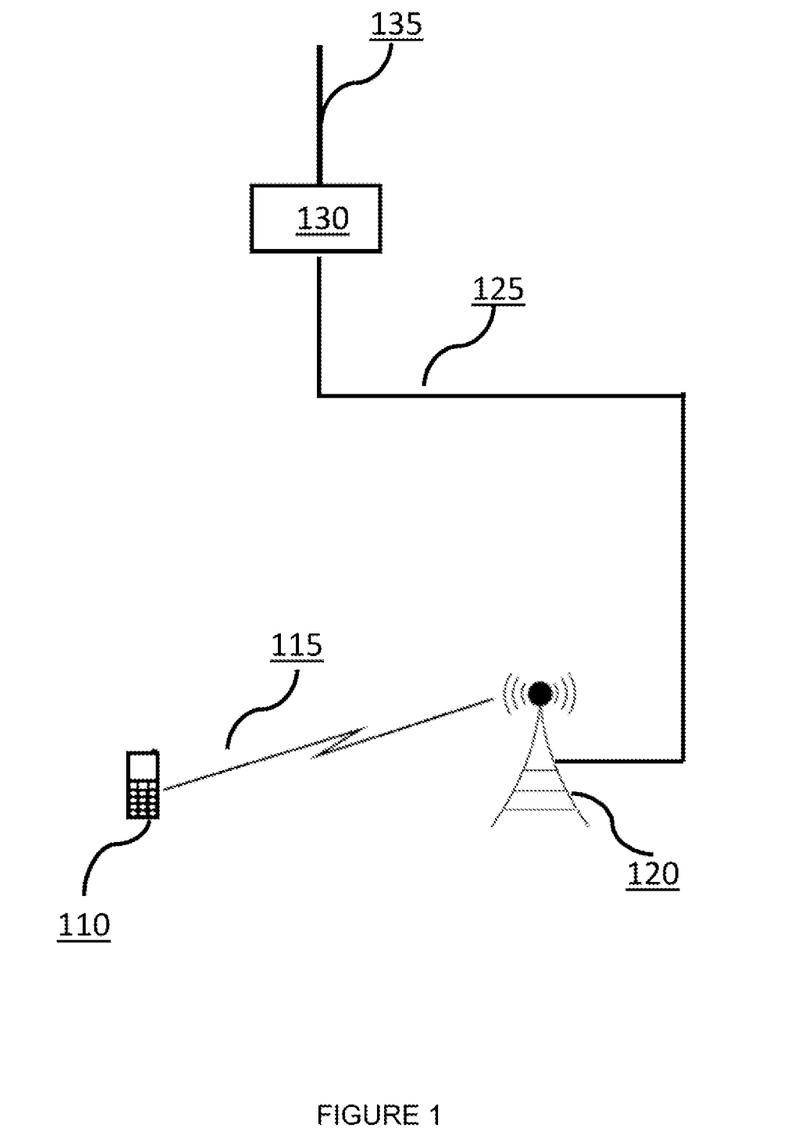
FIG. 1 illustrates an exemplary network scenario in accordance with at least some example embodiments.

FIG. 1 illustrates an exemplary radio network scenario in accordance with at least some example embodiments. According to the example scenario of FIG. 1, there may be a wireless communication network, which comprises User Equipment, UE 110, an access node, such as a Base Station, BS, 120, and core network element 130.

UE 110 may comprise, for example, a smartphone, a cellular phone, a Machine-to-Machine (M2M) node, Machine-Type Communications (MTC) node, an Internet of Things (IoT) node, a car, a car telemetry unit, a laptop computer, a tablet computer or another kind of suitable UE or mobile station. Generally, UE refers to any end device that may be capable of wireless communication. It can be either a mobile device or a stationary device. By way of example rather than limitation, a UE may also be referred to as a communication device, terminal device, a Subscriber Station (SS), a Portable Subscriber Station, a Mobile Station (MS), or an Access Terminal (AT). In the example system of FIG. 1, UE 110 may communicate wirelessly with BS 120, or with a cell of BS 120, via air interface 115. In some example embodiments, BS 120 may be considered as a serving BS, for UE 110. UE 110 may also communicate simultaneously with more than one BS 120 and/or more than one cell of BS 120.

BS 120 may be connected, directly or via at least one intermediate node, with core network 130 via interface 125. Core network 130 may be, in turn, coupled via interface 135 with another network (not shown in FIG. 1), via whichever connectivity to further networks may be obtained, for example via a worldwide interconnection network. BS 120 may be connected with one or multiple other BS as well via an inter-base station interface (not shown in FIG. 1).

UE 110 may be connected to BS 120 via air interface 115. Air interface 115 between UE 110 and BS 120 may be configured in accordance with a Radio Access Technology, RAT, which UE 110 and BS 120 are configured to support. Examples of cellular RATs include Long Term Evolution (LTE), New Radio (NR), which may also be known as fifth generation (5G) radio access technology. For example, in the context of LTE, BS 120 may be referred to as eNB while in the context of NR, BS 120 may be referred to as gNB. In any case, example embodiments are not restricted to any particular radio technology. Instead, example embodiments may be exploited in any wireless communication network (which may be a cellular or a non-cellular technology) operating in accordance to 3GPP standard, IEEE standard (such as for example IEEE 802.11 based local area networks), or it can be some other radio technology, wherein it is desirable to achieve an improved transmission and/or reception performance between an access node such as a BS, and a UE, and in particular, an improved MIMO performance.

Ever increasing data throughput requirements in wireless communication networks requires usage of wide frequency spectrum. Thus, for example, frequency bands for 5G (also referred to as NR) are currently separated into different frequency ranges. Frequency Range 1 (FR1) includes sub-6 GHz frequency bands, some of which are bands traditionally used by previous standards, but the range has been extended to cover potential new spectrum offerings up to to 7125 MHz. Another range is Frequency Range 2 (FR2) that at the moment includes frequency bands from 24.25 GHz to 52.6 GHz. Frequencies of this range and above are referred to as mmWave frequencies. MmWave frequency ranges are attractive because of higher available bandwidth than bands in the FR1, which helps to offer data rates that satisfy 5G demands.

The described embodiments can be particularly beneficial for mmWave frequencies, including FR2 ranges, but can be applied equally to FR1 or any other frequencies. As said earlier, although applicable to any wireless networks, we will in the following examples focus mainly on 5G, for the sake of simplicity. 5G has been envisaged to use more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control.

MIMO is one of the key enabling techniques for 5G wireless technology. The underlying principle of MIMO is to use multiple transmit and receive antennas to increase throughput and/or reliability of data transmission. Increased throughput can be achieved by transmitting/receiving different data streams over multiple antennas, while increased reliability can be achieved by using multiple antennas for transmitting/receiving multiple versions of the same data.

Beamforming antenna arrays play an important role in 5G implementations. Although offering high bandwidth, mmWave frequencies have higher propagation losses that greatly vary depending on the environment. Smaller wavelength at higher carrier frequencies allow smaller antenna element sizes which gives an opportunity to place one or more (for example, two, three or more) relatively large antenna arrays at a UE. This in turn leads to various challenges to maintain the expected performance.

Considering as a non-limiting example 2×2 MIMO, downlink (DL) MIMO performance (for example, in mmWave frequency ranges, such as FR2) may be achieved by using polarization split (co-polar and cross-polar) of a dual feed antenna array at a base station (referred to also as a gNB in the following) and/or at a UE, where each polarization corresponds to one MIMO branch. The reasoning behind this approach is to achieve high and similar antenna gain performance in both MIMO channels, while maintaining a compact spatial antenna design.

When designing dual-polarized antenna arrays, it is important to achieve high Cross Polarization Discrimination (XPD). XPD may be defined as a ratio of the co-polar component of the specified polarization and the orthogonal cross-polar component over a sector or beamwidth angle.

De-correlation at an antenna array may be obtained by ensuring that each antenna feed corresponds to a single polarization and that the resulting dual feed polarizations are designed to be orthogonal. This way, an antenna array with high XPD at the feed points may be designed. This approach will ensure full utilization of two MIMO channels for Line of Sight (LoS) and/or Non-Line of Sight (NLoS) operation provided that the maximum gain direction and the orientation of the orthogonal polarizations are aligned between antenna arrays at UE and at gNB.

In addition, high antenna gain requirements for mmWave (e.g. FR2) frequencies will reduce its radiation beam width, whereby beam steering at an antenna array (or arrays) is required to cover the needed angular space. The beam steering capabilities may be implemented using tunable phase shifters at each element in the antenna array, whereby the direction of the beam can be controlled electrically (phased array) instead of mechanically.

The XPD of any antenna (or antenna array) depends on its radiation pattern and may change dynamically as a function of the Angle of Departure (AoD) and/or Angle of Arrival (AoA). This dependency increases as the variations in the radiation pattern change and as the radiation patterns change electrically. Higher antenna gain pattern leads to larger XPD variations over the angular space. Phase controlled arrays also have increased XPD variations over the angular space.

As such, the physical orientation of antennas at mmWave frequencies will affect MIMO throughout much more than what is seen at Sub6 GHz frequencies, where the decorrelation at the UE is achieved by physical separation between two receiving antennas (each with random and different radiation pattern). Instead, the mmWave architecture may utilize dual orthogonally polarized antennas (or antenna arrays), designed for equal high gain radiation patterns.

Figure 2A:
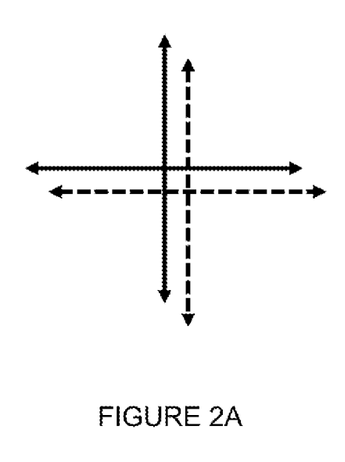
FIGS. 2A and 2B illustrate polarization alignment of antenna array with an incoming signal in accordance with at least some example embodiments.
Figure 2B:
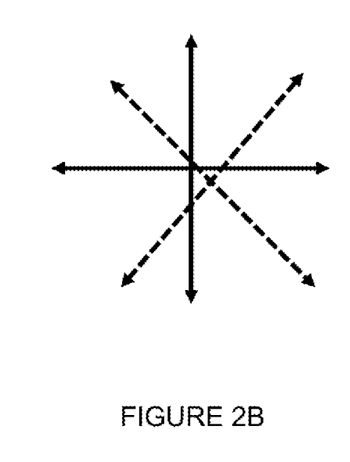

FIGS. 2A and 2B illustrate polarization alignment and/or misalignment. Arrows with solid lines in the figure show orthogonal polarizations of the antenna array at the UE, while dotted lines show polarizations of the incoming MIMO signal. The aligned case (FIG. 2A) on the left will result in a high XPD while the misaligned case (FIG. 2B) on the right will result in a low XPD. The former case (FIG. 2A) may result in MIMO rank 2, while the latter case (FIG. 2B) may result in MIMO rank 1 as measured and/or reported (e.g. by means of rank indicator, RI) by the UE, although it is configured to communicate with an access point (e.g. a gNB) using 2×2 MIMO. The MIMO throughput can therefore be reduced by a factor of up to two when the high XPD is lost at the UE, since it will be more difficult or even impossible to distinguish the two MIMO channels from each other, as they are mixed at both receive chains and not each received separately on the two receive chains. The MIMO might thus not be achieved with an expected quality in many of these cases and the communication may be going as if no MIMO was in use.

Thus, the XPD of an antenna array may depend on angle of arrival (AoA) and the orientation (that is, an alignment) of the incoming orthogonal MIMO signals. For considered dual-polarized antenna, the highest XPD can be achieved for perfectly aligned incoming orthogonal 2×2 MIMO signal, while 45° offset in alignment will lead to lowest XPD.

Various experiments have shown dependency between AoA, polarization alignment and XPD. In addition, the XPD of the two feed points (co-polarized and cross-polarized) of the UE antenna array may also vary independently, even for the same AoA, and both antenna array feed points must have sufficiently high XPD to obtain an overall high MIMO rank. The two feed points of the antenna array may be affected differently by non-optimal surrounding environment where the antenna array is mounted, especially from the chassis and glass of a UE. This will generate different radiation patterns, even with the same antenna array weights (power and phase) and thereby directly affect the XPD.

Figure 3A:
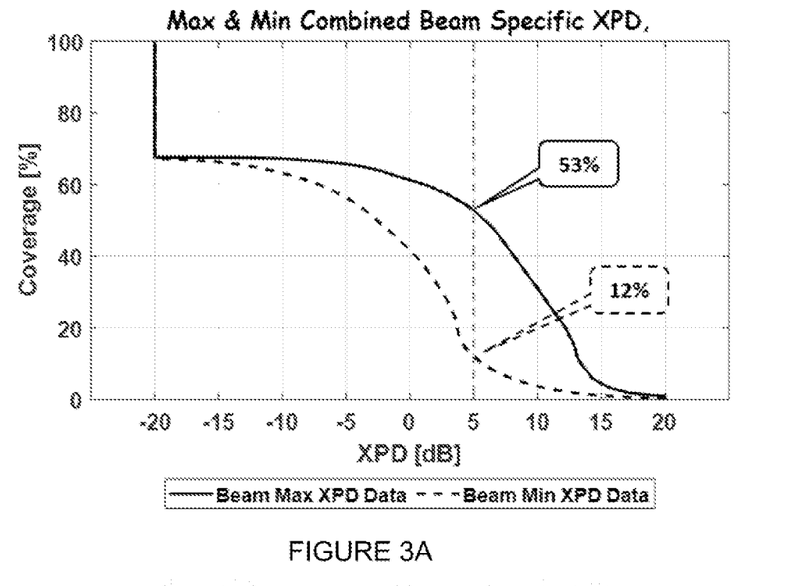
FIGS. 3A and 3B illustrate XPD variations depending on polarization alignment in accordance with at least some example embodiments.
Figure 3B:
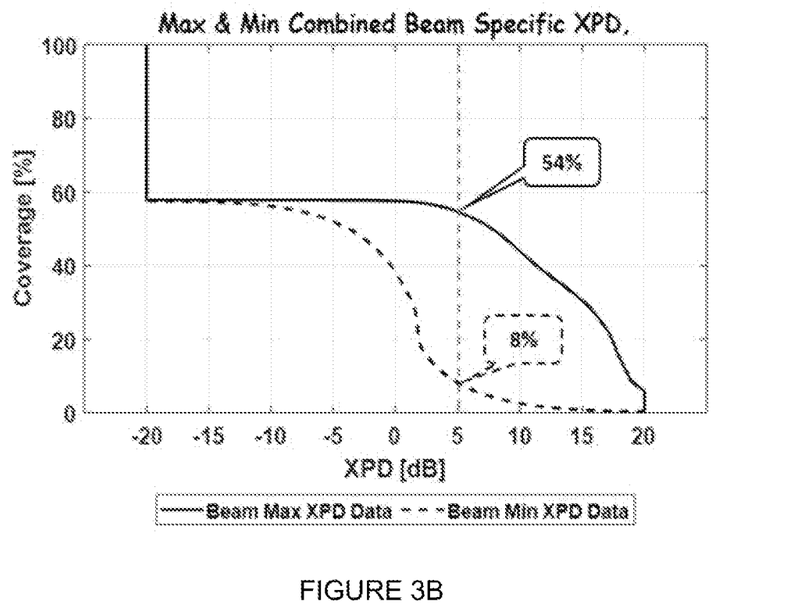

FIGS. 3A and 3B illustrate XPD variations depending on the alignment of an antenna array with an incoming MIMO signal. The maximum XPD is simulated for perfectly aligned incoming orthogonal 2×2 MIMO signal, while minimum XPD is simulated with a 45° offset in alignment. The results are shown for different AoA's, where XPD values larger than 20 dB have been truncated to 20 dB, and values less than −20 dB have been truncated to −20 dB. FIG. 3A shows the maximum and minimum XPD for the first polarization (co-polarized) of the UE antenna array, while FIG. 3B shows the XPD values for the second polarization (cross-polarized).

XPD values larger than 5 dB (which are considered as the minimum XPD value for reasonable MIMO performance in this example, but other values can also be considered depending on the MIMO capabilities of the device) is achieved for 50% of the full angular space by a single antenna array when the array is perfectly aligned with the incoming orthogonal MIMO signal. This number drops to around 10% for the misaligned case with minimum XPD values Furthermore, the XPD needs to be sufficiently high (such as better than 5 dB) for both feed points (co-polarized and cross-polarized) on the UE antenna array at a specific angular direction, to ensure sufficient MIMO (rank 2 in this case) performance and this is only achieved for approximately 46% of the angular space for perfect alignment and below 1% for worst-case misalignment. Increasing the number of antenna arrays may also increase XPD coverage values by approximately a multiplication factor equal to the number of antenna arrays. As such, a UE with three antenna arrays (current 3GPP working assumption) could in theory (assuming limited overlap between the different radiation patterns) achieve a full XPD coverage when the incoming orthogonal MIMO signal is perfectly aligned with the antenna array at the UE, but it may still be very low (sometimes even below 1%) for misaligned cases. It is evident that a typical phased antenna array, which will typically be implemented on a smart phone will have a limited angular space where it can actually receive a 2×2 DL orthogonal MIMO signal with the needed decorrelation (for example resulting in at least 5 dB XPD) between the two feeder points, even if the UE is in LoS of the gNB and have potential optimal reception conditions.

As such, best MIMO performance might not always be obtained by using one dual feed antenna array at the UE, which is aligned towards the strongest angular power group (APG). In some cases, it may be beneficial for a UE to utilize two or more antenna arrays instead of a single one to obtain good MIMO performance, for example, to obtain desired MIMO rank.

Embodiments of the present invention therefore address the above mentioned challenges by providing improvements which enable more efficient operation of wireless communication network. For instance, embodiments of the present invention optimize MIMO performance depending on the environment. Thus, for example, embodiments of the present invention enable dynamic optimization of MIMO performance as the environment changes and not only rely on high gain dual orthogonal feed approach.

The obtained MIMO performance (which can be defined for example by MIMO rank, a parameter identifying MIMO rank, or any other suitable quality metric or metrics) will depend on the channel conditions, but it may also depend on the XPD of the receiving antennas at the UE. The UE cannot directly affect the channel conditions, but it can affect the way it "sees" the current channel conditions by how it chooses to configure its antennas, especially when operating in channel conditions with multiple strong component carriers and/or APGs typically coming from reflections, either with a line-of-sight (LoS) component or only non-line-of-sight (Non-LoS, or NLoS) components. UE may often operate in such environment (referred to as a multipath propagation environment). Thus, in some embodiments, UE may search for a second usable APG, when the XPD for the primary APG (corresponding to the current connection to the gNB) is insufficient to support sufficient MIMO performance (e.g. MIMO rank 2).

Figure 4:
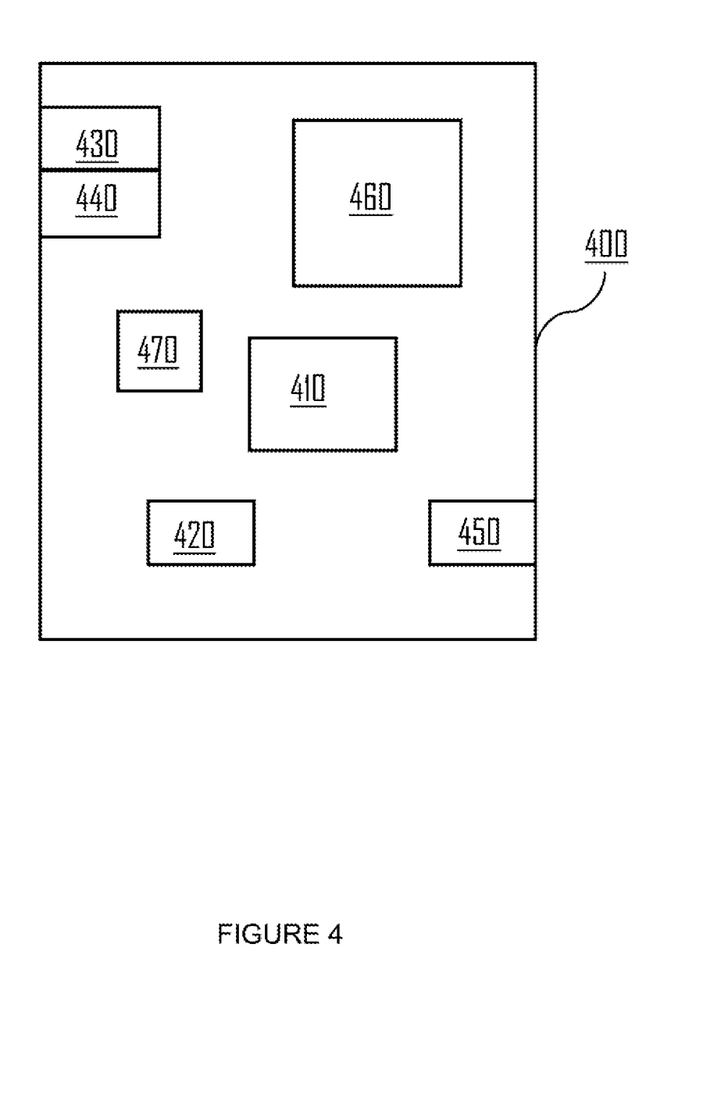
FIG. 4 illustrates an example apparatus capable of supporting at least some embodiments.

FIG. 4 illustrates an example apparatus capable of supporting at least some embodiments. Illustrated is apparatus 400, which may be, or comprised in, for example, a UE 110. Comprised in apparatus 400 is processor 410, which may comprise, for example, a single- or multi-core processor wherein a single-core processor comprises one processing core and a multi-core processor comprises more than one processing core. Processor 410 may comprise, in general, a control device. Processor 410 may comprise more than one processor. Processor 410 may be a control device. A processing core may comprise, for example, a Cortex-A8 processing core manufactured by ARM Holdings or a Steamroller processing core produced by Advanced Micro Devices Corporation. Processor 410 may comprise at least one Qualcomm Snapdragon and/or Intel Atom processor. Processor 410 may comprise at least one Application-Specific Integrated Circuit, ASIC. Processor 410 may comprise at least one Field-Programmable Gate Array, FPGA. Processor 410 may be means for performing method steps in device 400. Processor 410 may be configured, at least in part by computer instructions, to perform actions.

A processor may comprise circuitry, or be constituted as circuitry or circuitries, the circuitry or circuitries being configured to perform phases of methods in accordance with embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as UE 110 or BS 120, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 400 may comprise memory 420. Memory 420 may comprise random-access memory and/or permanent memory. Memory 420 may comprise at least one RAM chip. Memory 420 may comprise solid-state, magnetic, optical and/or holographic memory, for example. Memory 420 may be at least in part accessible to processor 410. Memory 420 may be at least in part comprised in processor 410. Memory 420 may be means for storing information. Memory 420 may comprise computer instructions that processor 410 is configured to execute. When computer instructions configured to cause processor 410 to perform certain actions are stored in memory 420, and device 400 overall is configured to run under the direction of processor 410 using computer instructions from memory 420, processor 410 and/or its at least one processing core may be considered to be configured to perform said certain actions. Memory 420 may be at least in part comprised in processor 410. Memory 420 may be at least in part external to device 400 but accessible to device 400.

Device 400 may comprise a transmitter 430. Device 400 may comprise a receiver 440. Transmitter 430 and receiver 440 may be configured to transmit and receive, respectively, information in accordance with at least one cellular or non-cellular standard. Transmitter 430 may comprise more than one transmitter. Receiver 440 may comprise more than one receiver. Transmitter 430 and/or receiver 440 may be configured to operate in accordance with Global System for Mobile Communication, GSM, Wideband Code Division Multiple Access, WCDMA, 5G/NR, Long Term Evolution, LTE, IS-95, Wireless Local Area Network, WLAN, Ethernet and/or Worldwide Interoperability for Microwave Access, WiMAX, standards, for example.

Device 400 may comprise a Near-Field Communication, NFC, transceiver 450. NFC transceiver 450 may support at least one NFC technology, such as NFC, Bluetooth, Wibree or similar technologies.

Device 400 may comprise User Interface, UI, 460. UI 460 may comprise at least one of a display, a keyboard, a touchscreen, a vibrator arranged to signal to a user by causing device 400 to vibrate, a speaker and a microphone. A user may be able to operate device 400 via UI 460, for example to accept incoming telephone calls, to originate telephone calls or video calls, to browse the Internet, to manage digital files stored in memory 420 or on a cloud accessible via transmitter 430 and receiver 440, or via NFC transceiver 450, and/or to play games.

Device 400 may comprise or be arranged to accept a user identity module 470. User identity module 470 may comprise, for example, a Subscriber Identity Module, SIM, card installable in device 400. A user identity module 470 may comprise information identifying a subscription of a user of device 400. A user identity module 470 may comprise cryptographic information usable to verify the identity of a user of device 400 and/or to facilitate encryption of communicated information and billing of the user of device 400 for communication effected via device 400.

Processor 410 may be furnished with a transmitter arranged to output information from processor 410, via electrical leads internal to device 400, to other devices comprised in device 400. Such a transmitter may comprise a serial bus transmitter arranged to, for example, output information via at least one electrical lead to memory 420 for storage therein. Alternatively to a serial bus, the transmitter may comprise a parallel bus transmitter. Likewise processor 410 may comprise a receiver arranged to receive information in processor 410, via electrical leads internal to device 400, from other devices comprised in device 400. Such a receiver may comprise a serial bus receiver arranged to, for example, receive information via at least one electrical lead from receiver 440 for processing in processor 410. Alternatively to a serial bus, the receiver may comprise a parallel bus receiver.

Device 400 may comprise further devices not illustrated in FIG. 4. For example, where device 400 comprises a smartphone, it may comprise at least one digital camera. Some devices 400 may comprise a back-facing camera and a front-facing camera, wherein the back-facing camera may be intended for digital photography and the front-facing camera for video telephony. Device 400 may comprise a fingerprint sensor arranged to authenticate, at least in part, a user of device 400. In some embodiments, device 400 lacks at least one device described above. For example, some devices 400 may lack a NFC transceiver 450 and/or user identity module 470.

Processor 410, memory 420, transmitter 430, receiver 440, NFC transceiver 450, UI 460 and/or user identity module 470 may be interconnected by electrical leads internal to device 400 in a multitude of different ways. For example, each of the aforementioned devices may be separately connected to a master bus internal to device 400, to allow for the devices to exchange information. However, as the skilled person will appreciate, this is only one example and depending on the embodiment various ways of interconnecting at least two of the aforementioned devices may be selected without departing from the scope of the present invention.

According to an embodiment of the invention, UE 110 may monitor and/or evaluate its current MIMO quality. For example, UE 110 may monitor a certain parameter or a set of parameters related to MIMO quality (in a non-limited embodiment this can be MIMO rank, a parameter related to MIMO rank or used to obtain MIMO rank value which UE then reports to gNB, or any other suitable quality metric or metrics). For example, UE 110 may apply various algorithms to estimate the current MIMO rank, based on the measurements on reference signals (such as DMRS). In this context, invertibility of the MIMO channel matrix may be used, and different metrics may be considered, such as singular values, condition number, as well as any other metric that may qualify the invertibility of the MIMO channel matrix. Averages of various metrics, or any filtered values, could also be used, such as sliding window, finite impulse response filter, infinite impulse response filter or any order (e.g. first, second, . . . , n-th order) should also be considered. The Frequency average of channel estimates of the MIMO channel may be also taken into consideration, such as narrow band on single subcarrier DMRS or full blown bandwidth allocated to UE, with different averaging techniques.

According to an embodiment of the invention, UE 110 may correlate MIMO transmission and/or reception quality with a Power Delay Profile (PDP) of an incoming signal. The PDP characterizes an intensity of a signal received through a multipath channel as a function of time delay. PDP thus may indicate multipath component(s) based on power peaks above threshold level over a delay interval.

In an embodiment, the UE 110 may determine if a possible better antenna configuration at the UE 110 could improve transmission and/or reception quality (such as MIMO rank or any other suitable quality metric as described above) and/or throughput, based on a parameter associated with the current MIMO quality and a PDP.

In an embodiment, the UE may use reference signals to scan for a new component carrier and/or APG. This could be CSI-RS (for example, with repetition set to "On"), SSB, position reference signal or some other existing or future suitable reference signal or signals. Also dedicated reference signals may be defined in the standard for these purposes. In an embodiment, the UE may then configure a single or multiple (two or more) antenna arrays for MIMO reception of multiple component carriers of different AoA, where the chosen polarization configuration is optimized for optimal MIMO rank and/or combined power.

Thus, according to at least some embodiments, UE may determine if it is receiving a different signal component (e.g. a second component) by evaluating radio channel estimated PDP of the received signal. The PDP estimation can be performed for each polarization, wherein each polarization may correspond to a particular MIMO branch. The PDP estimation can be done with wide beams. The UE and can thereby avoid blindly doing a time-consuming full beam scan on the whole antenna array if it is not needed.

According to an embodiment, the findings of the present invention are utilized in order to configure the antennas on the UE for better MIMO transmission and/or reception, for example in the case where the envisioned direct dual polarized MIMO configuration fails to achieve a sufficiently high MIMO rank in either LoS or NLoS environments.

In at least some embodiments, a UE 110 may receive one or more reference signal from a BS, such as demodulation reference signal (DMRS), CSI-RS, or some other reference signal or signals. The UE 110 may further use one or more received reference signal for evaluating MIMO quality (in a non-limiting embodiment, this can be MIMO rank, a parameter related to or indicative of MIMO rank, or any other suitable quality metric or metrics). Alternatively or in addition to using reference signals, the UE 110 may use some other method or combination of method for evaluating MIMO quality.

In an embodiment, UE 110 may calculate its current MIMO quality (such as rank, a parameter indicating the rank, or any other suitable quality metric as described above) with current antenna configuration. Next, the UE 110 may determine whether the current MIMO quality is sufficient. For example, in an embodiment, UE 110 can compare its current MIMO quality with a pre-determined threshold. In an embodiment, the threshold can be for example UE driven. In some other embodiments, the threshold can be controlled by the network. Embodiments of the present invention may be applied to various MIMO configurations, such as 2×2 MIMO, 4×4 MIMO, or any other MIMO configuration.

If MIMO quality is above the threshold, in an embodiment this may indicate that current MIMO quality (e.g. rank) is sufficient. The UE 110 may in this case keep the current antenna configuration unchanged. The UE 110 may further wait for the next scheduled reference signal (for example, DMRS, CSI-RS or some other reference signal). Comparing to a threshold can also be implemented in a form of evaluating TRUE/FALSE condition.

Figure 5A:
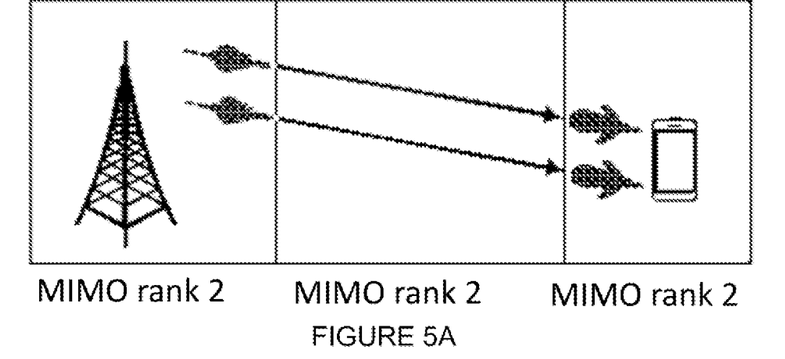
FIGS. 5A-5C illustrate examples with different MIMO ranks seen by user equipment in accordance with at least some embodiments.

FIG. 5A illustrates a scenario in which a UE sees current MIMO rank 2 (the rank is considered to be above threshold in this example). In this case there is a high XPD at gNB, in the channel, and at the UE.

In an embodiment, if the MIMO quality is below a threshold (or if some other condition indicative of MIMO quality is not satisfied), UE 110 may trigger a measurement of a power delay profile (PDP). PDP measurement may assist UE in configuring its antennas for a better MIMO transmission and/or reception.

In an embodiment, for PDP measurement, the UE 110 may use some reference signal or signals. For example, the UE 110 may wait for the next scheduled reference signal. This could be for example channel state information reference signal (CSI-RS) with repetition set to "On", synchronization signal block (SSB), position reference signal or another existing or future suitable reference signal or signals. For example, a dedicated reference signal or signals may be introduced suitable for PDP measurements. Generally, reference signals can be same or different reference signals than those used for MIMO quality evaluation.

Figure 5B:
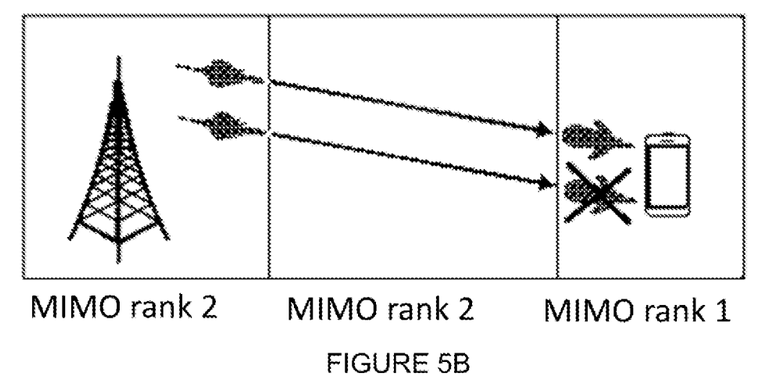

FIG. 5B illustrates an example scenario in which a UE current MIMO rank dropped to 1 (that is, considered to be below a threshold), which may trigger PDP measurements. This can be due to decreased XPD at UE 110.

In an embodiment, the UE 110 may calculate the PDP on one or more antenna arrays. For example, the UE 110 may calculate PDP on each of its antenna arrays. This may need to be done sequentially depending on the HW architecture of the UE 110. In some embodiments, PDP measurements may also be done on both polarizations of the antenna array or arrays. In some embodiments, the PDP can be calculated using wide beams. In some embodiments, UE 110 may combine multiple PDP measurements to generate a full view of the APGs seen by the UE 110.

In an embodiment, the UE 110 may determine if the channel contains a second (that is a new, currently not in use) strong usable component carrier and/or APG. If not, then the UE 110 may decide to keep the current antenna configuration, since the channel only has one usable APG. At this point, in an embodiment, the UE 110 may then wait for the next scheduled reference signal, such as CSI-RS or some other reference signal.

In an embodiment, if the UE 110 determined based on a PDP measurement that there may be a second strong (usable) component carrier and/or APG, the UE 110 may consider changing its antenna configuration.

At this stage, in an embodiment, the UE 110 may wait for the next scheduled reference signal (this could be CSI-RS with repetition set to "On", SSB, position reference signal or another existing or future suitable reference signal or signals). The UE 110 may further scan for a usable reflection on the antenna array where the second APG was strong. In case several strong APGs were detected, the UE 110 may select the antenna array on which the second APG was strongest.

In an embodiment, the UE 110 may further search or scan for a usable reflection on the antenna array where the second APG was strongest. The search can be done for example with narrow beams. The UE 110 may then determine whether a suitable reflection was found.

In an embodiment, if a suitable reflection was not found, the UE 110 may decide to keep its antenna configuration unchanged. Alternatively, UE 110 may in an embodiment still determine whether an additional scan for a reflection is to be performed. Thus, there may be a predetermined value indicating how many iterations can or need to be performed at most, or there may be a timer allowing further scan for a certain time. In case of an additional scan, the UE 110 may once again wait for the next scheduled reference signal (this again could be CSI-RS with repetition set to "On", SSB, position reference signals or another existing or future suitable reference signal).

In an embodiment, if the UE 110 determines that no additional scan is to be performed (for example, in case if predetermined loop value is exceeded), the UE 110 may conclude to keep the current antenna configuration, since a usable reflection was not found (e.g. within a given time window). The UE 110 may then wait for the next scheduled reference signals, such as CSI-RS and possibly repeat MIMO rank evaluation.

In an embodiment, if a suitable reflection was found, the UE 110 may consider changing its antenna configuration. To this end, the UE 110 may for example determine whether the second APG is on the same antenna array as the first APG or on a different antenna array. In some embodiments, if the second APG is determined to be on the same antenna array as the first APG, the UE 110 may configure each of the two Rx-Chains for each of the two APG's using different radiation patterns. The UE 110 may further select the polarization configuration at the antenna array with the combined highest received power level. If, on the contrary, the second APG is determined to be on a different antenna array than the first APG, the UE 110 may in some embodiments configure each of the two Rx-Chains for each of the two antenna arrays.

Figure 5C:
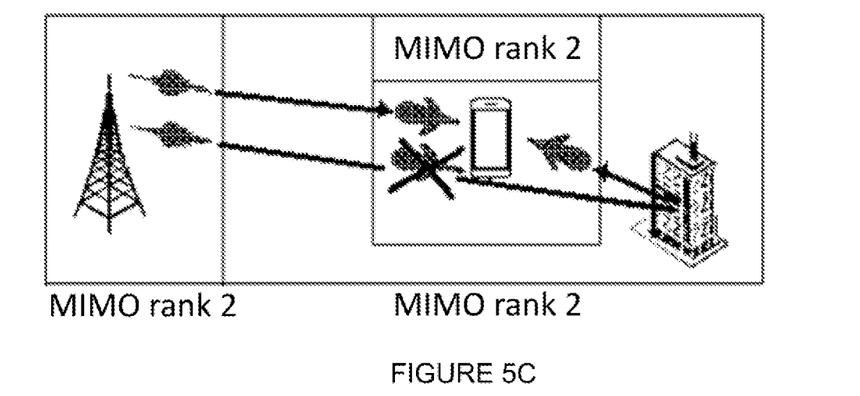

FIG. 5C illustrates an example of taking a second antenna array into use at UE in order to increase current MIMO rank and/or performance. The UE may further select the polarization configuration at the two antenna arrays with the combined highest received power level. In this case the XPD will be again sufficiently high.

At any of the above steps, if the UE 110 determines that one or more of pre-defined conditions for changing antenna configuration is not fulfilled (e.g. if MIMO quality is reasonable, or if a second strong APG was not found), the UE 110 may decide to keep current antenna configuration. In this case, the UE 110 may wait for the next scheduled reference signal and repeat the procedure or rank and/or PDP evaluation.

Generally, scanning procedure for a potential second component carrier/APG could be slow (such as in an order of hundreds of ms) when only using the existing allocated reference signals and for a UE 110 with only two receiver chains in the transceiver/baseband. One way to cope with this is to specify new dedicated reference signals used for the described purposes (for example, dedicated reference signals can be defined in 3GPP standard specifically for PDP measurements). Such reference signals and/or related measurements in the context of 5G could be specified for example in TS 38.331, TS 38.211 or other specification.

Additionally or alternatively, in some embodiments, the described concepts could be activated and/or deactivated depending on the use case. For example, some of the described methods (such as PDP measurement) could be activated only in static and semi-static conditions, where a slow initial set-up time is not a problem. That is, disabling the described features at high speeds (for example, in dynamic environments) could be beneficial in some cases to avoid unnecessary scanning and power usage.

The scanning procedure could be done using all receiver chains at the UE 110 to ensure a short scanning time, however, at a cost of reduced data reception at these scanning time instances, since the receiver chains at the UE 110 will be configured with beams covering a different angular direction than the incoming data. However, the UE 110 knows if data is scheduled for it, when a suitable reference signal is allocated and can decide to prioritize data reception or scanning, depending on the current channel conditions.

Figure 6:
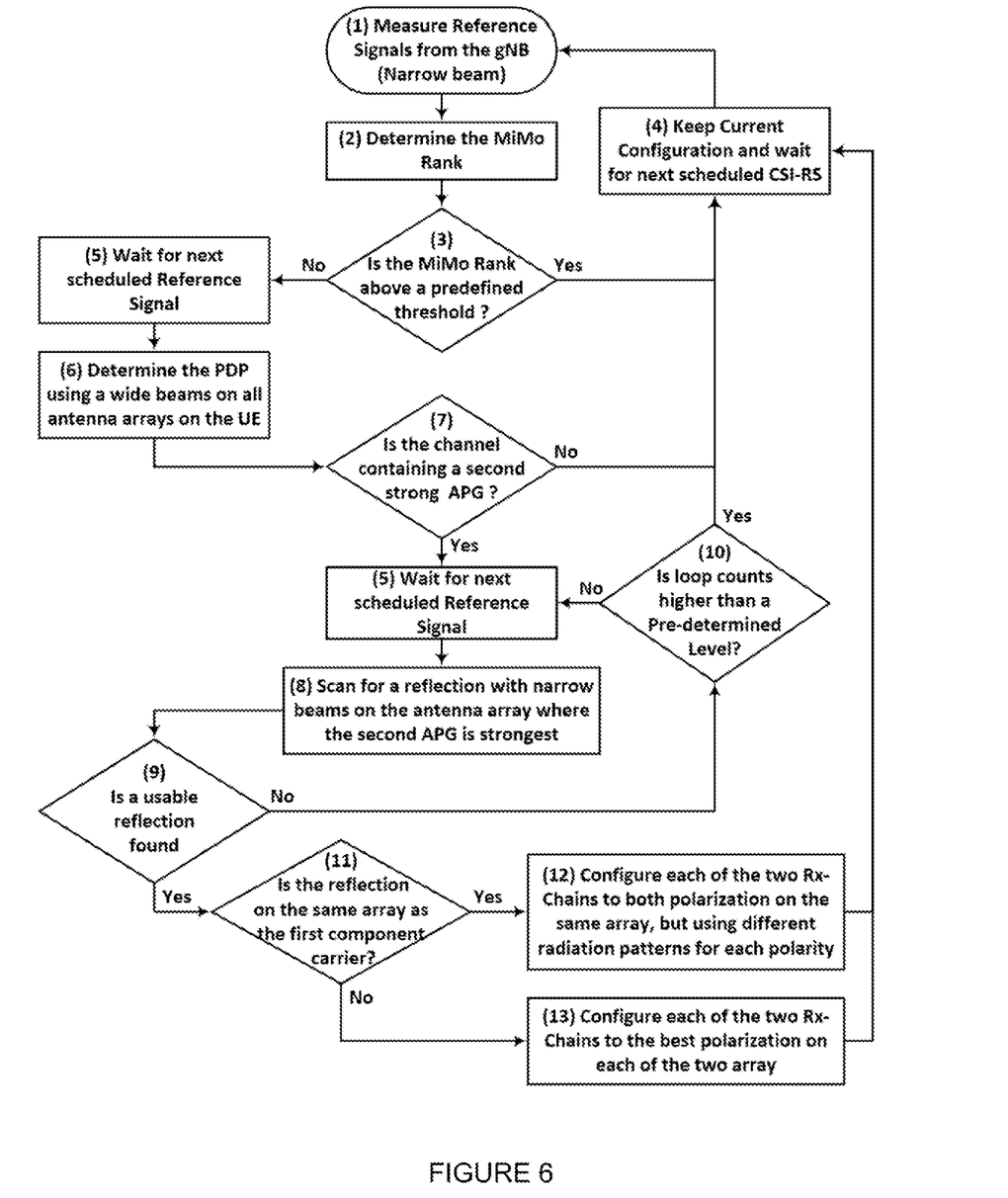
FIG. 6 illustrates an exemplary flow chart in accordance with at least some embodiments.

FIG. 6 illustrates a flow chart in accordance with at least some exemplary embodiments. It is to be noted, that the steps described in FIG. 6 can performed in a variety of subsets and/or in a revised order.

According to the embodiments of the present invention, the UE 110 may scan for e.g. two strongest component carriers and/or APGs and use those two for MIMO reception, if the strongest APG alone has an insufficient MIMO rank.

Figure 7A:
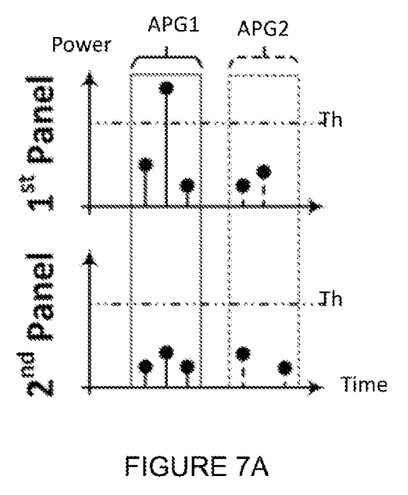
FIGS. 7A-7C illustrate examples with different angular power groups.
Figure 7B:
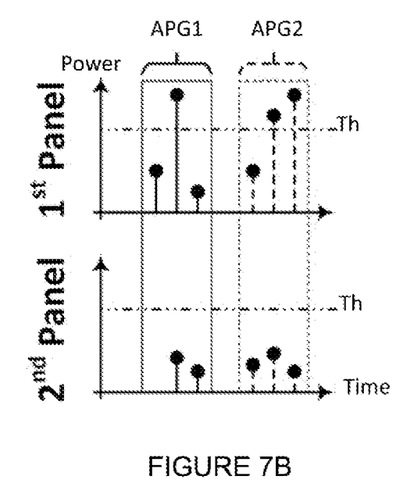
Figure 7C:
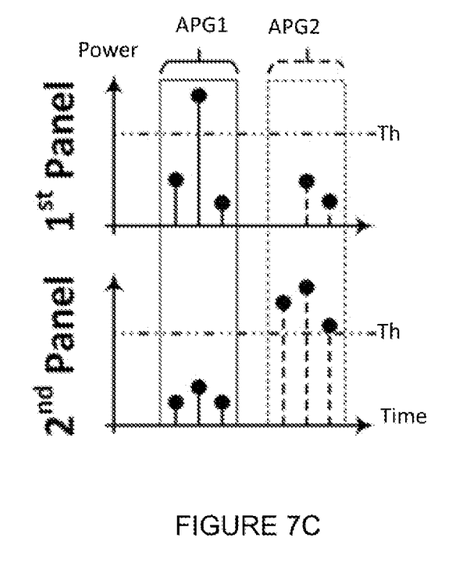

APG depends on the power collected by a given configured antenna array beam. Multiple APGs are divided in time and can consist of multiple power components. Thus, each configured beam on each antenna array may have different APG at a given time. FIGS. 7A-7C illustrate two APGs based on PDP measurements for two antenna arrays (panels) with a given radiation pattern. The results of each antenna array can be combined to give a broader view of the current environment. FIG. 7A illustrates a case where no useable components are found in the second APG (PDP falls below a threshold Th at both antenna panels for the second APG). FIG. 7B illustrates a case where useable components are found in a second APG on the same antenna array (panel) as the first APG (PDP is above a threshold at the first antenna panel for the second APG). FIG. 7C illustrates the case where useable components are found in a second APG on a different antenna panel than the first APG (PDP is above a threshold for the second antenna panel).

Embodiments of the present invention allow optimization of the UE antenna and/or antenna array configuration to improve the MIMO throughput, for example in a case if the main component carrier is arriving at an angular direction where the combined XPD of dual polarized antenna array is insufficient for MIMO reception. Adapting the MIMO configuration may lead to increased throughput and/or to a better power utilization at the UE. A typical UE with for example three antenna arrays may be able to align a beam (with less than 5 dB gain reduction) towards the angular direction of a LoS incoming orthogonal MIMO signal for a large portion (e.g. 90% or more) of the full angular space. However, it can be so that the needed XPD for MIMO reception may only be achieved for a limited portion of the angular directions. As such, the UE may experience a drop in throughput of a factor up to 2 (corresponding to dropping from rank 2 to rank 1) that might be avoided by implementing embodiments of the present invention.

Figure 8:
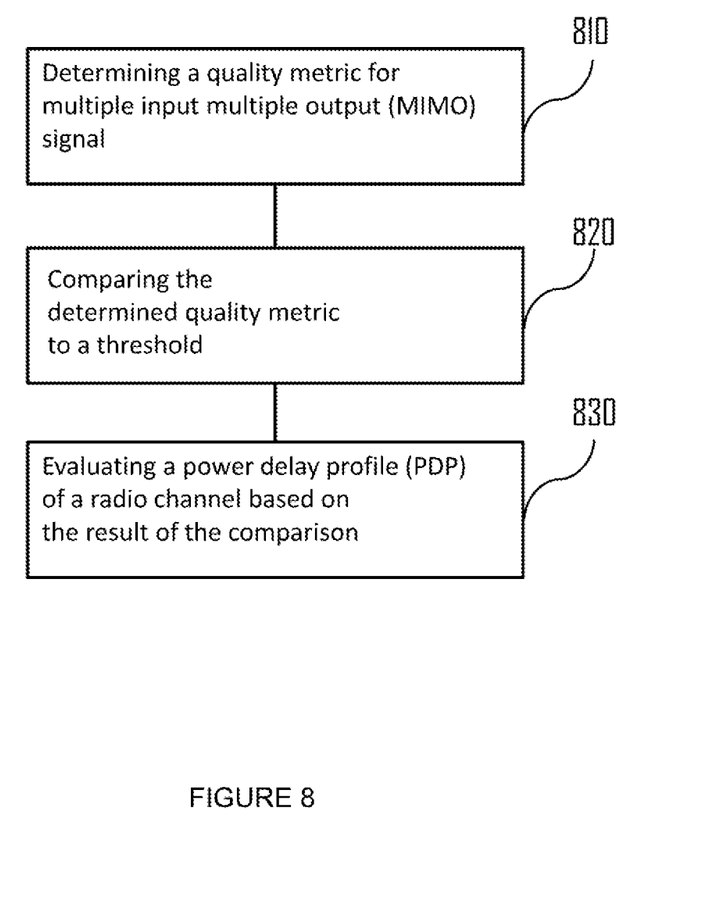
FIG. 8 illustrates a method in accordance with at least some embodiments.

FIG. 8 represents a flow chart of a first method in accordance with at least some embodiments. The phases of the illustrated first method may be performed by an apparatus, such as UE 110, or by a control device configured to control the functioning thereof, possibly when installed therein.

The first method may comprise, at step 810, determining a quality metric for multiple input multiple output (MIMO) signal. The first method may also comprise, at step 820, comparing the determined MIMO quality metric to a threshold. Finally, the first method may comprise, at step 830, evaluating a power delay profile (PDP) of a radio channel based on the result of the comparison. The quality metric may for example comprise MIMO rank of received signal.

It is to be understood that the embodiments disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

In an exemplary embodiment, an apparatus, such as, for example, UE 110 or BS 120, may comprise means for carrying out the embodiments described above and any combination thereof.

In an exemplary embodiment, a computer program may be configured to cause a method in accordance with the embodiments described above and any combination thereof. In an exemplary embodiment, a computer program product, embodied on a non-transitory computer readable medium, may be configured to control a processor to perform a process comprising the embodiments described above and any combination thereof.

In an exemplary embodiment, an apparatus, such as, for example, UE 110 or BS 120, may comprise at least one processor, and at least one memory including computer program code, wherein the at least one memory and the computer program code are configured to, with the at least one processor, cause the apparatus at least to perform the embodiments described above and any combination thereof.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the embodiments in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

ACRONYMS LIST

3GPP 3rd Generation Partnership Project
AoA Angle of Arrival
AoD Angle of Departure
APG Angular Power Group
ASIC Application-Specific Integrated Circuit
BS Base Station
CSI Channel State Information
CSI-RS Channel State Information Reference Signal
DMRS Demodulation Reference Signal
FPGA Field-Programmable Gate Array
GSM Global System for Mobile communication
HW Hardware
IoT Internet of Things
LoS Line of Sight
LTE Long-Term Evolution
MIMO Multiple Input Multiple Output
M2M Machine-to-Machine
NLoS Non-Line of Sight
NR New Radio
PDP Power Delay Profile
RAT Radio Access Technology
RAN Radio Access Node
UE User Equipment
XPD Cross Polarization Discrimination

The invention claimed is:

1. An apparatus, comprising:
at least one processor; and
at least one memory including computer program code, said at least one memory and computer program code being configured, with the at least one processor, to cause the apparatus to perform
determining a quality metric for multiple input multiple output (MIMO) signal;
comparing the determined quality metric to a threshold;
evaluating a power delay profile (PDP) of a radio channel based on the result of the comparison; and
identifying an angular power group (APG) based on a result of the evaluation.

2. The apparatus of claim 1, wherein the signal is a received signal, and wherein the quality metric indicates MIMO rank.

3. The apparatus of claim 1, wherein the at least one memory and computer program code are further configured, with the at least one processor, to cause the apparatus to perform evaluating the PDP of the radio channel if the determined quality metric is below the threshold.

4. The apparatus of claim 1, wherein the determination of the quality metric comprises performing at least one measurement with at least one reference signal.

5. The apparatus of claim 1, wherein the evaluating the PDP of the radio channel comprises PDP measurement for one or more antenna array with at least one reference signal.

6. The apparatus of claim 5, wherein the PDP measurement comprises measuring PDP on wide beams for multiple antenna arrays to obtain an information about multiple Angular Power Groups (APGs).

7. The apparatus of claim 1, wherein the at least one memory and computer program code are further configured, with the at least one processor, to cause the apparatus to perform determining an antenna configuration based on result of the evaluation.

8. The apparatus of claim 1, wherein the at least one memory and computer program code are further configured, with the at least one processor, to cause the apparatus to perform selecting an antenna array among a plurality of antenna arrays for which the identified APG is the strongest among APGs that are currently not in use.

9. The apparatus of claim 1, wherein the at least one memory and computer program code are further configured, with the at least one processor, to cause the apparatus to perform identifying a reflection with a narrow beam corresponding to the identified APG.

10. The apparatus of claim 1, wherein the at least one memory and computer program code are further configured, with the at least one processor, to cause the apparatus to perform configuring a transmit and/or receive chain of the apparatus for the identified APG.

11. The apparatus of claim 10, wherein the at least one memory and computer program code are further configured, with the at least one processor, to cause the apparatus to perform configuring the transmit and/or receive chain of the apparatus for the identified APG using different radiation pattern than radiation pattern of a first, currently configured APG, if the identified APG corresponds to an antenna array of the first APG.

12. The apparatus of claim 11, wherein the at least one memory and computer program code are further configured, with the at least one processor, to cause the apparatus to perform configuring the transmit and/or receive chain of the apparatus for the identified APG using optimized polarization, if the identified APG does not correspond to an antenna array of a first, currently configured, APG.

13. The apparatus of claim 1, wherein the at least one memory and computer program code are further configured, with the at least one processor, to cause the apparatus to perform selecting antenna polarization configuration corresponding to at least one of an optimized signal power level or an optimized MIMO rank.

14. A method, comprising:
determining a quality metric for multiple input multiple output (MIMO) signal;
comparing the determined quality metric to a threshold;
evaluating a power delay profile (PDP) of a radio channel based on the result of the comparison; and
identifying an angular power group (APG) based on a result of the evaluation.

15. The method of claim 14, wherein the signal is a received signal, and wherein the quality metric indicates MIMO rank.

16. The method of claim 14, further comprising evaluating the PDP of the radio channel if the determined quality metric is below the threshold.

17. The method of claim 14, wherein the determination of the quality metric comprises performing at least one measurement with at least one reference signal.

18. The method of claim 14, wherein the evaluating the PDP of the radio channel comprises PDP measurement for one or more antenna array with at least one reference signal.

19. The method of claim 18, wherein the PDP measurement comprises measuring PDP on wide beams for multiple antenna arrays to obtain an information about multiple Angular Power Groups (APGs).

* * * * *